L. BOWLING.
GO-CART HANDLE.
APPLICATION FILED MAR. 21, 1912.
1,042,193.
Patented Oct. 22, 1912.
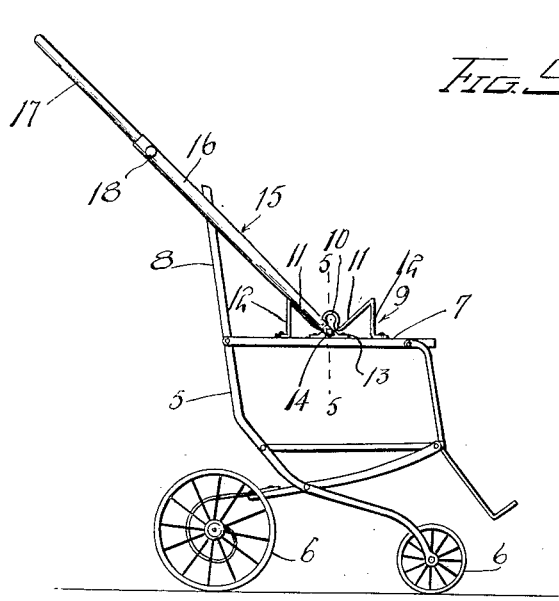
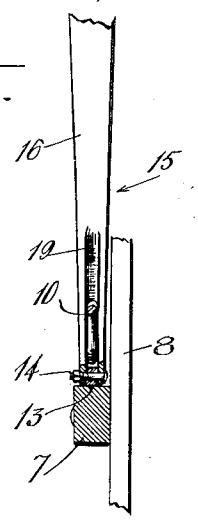
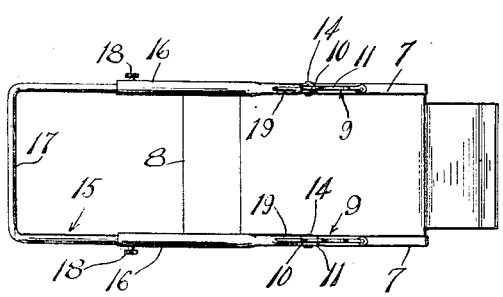
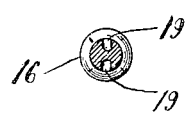
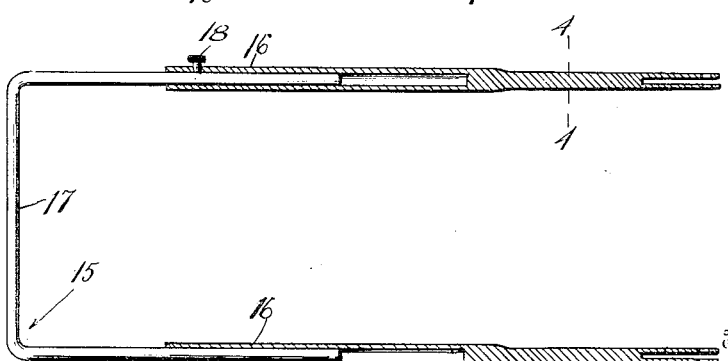
Witnesses
Inventor
L. Bowling.
Attorneys

UNITED STATES PATENT OFFICE.

LILIAN BOWLING, OF FAIRVIEW, OKLAHOMA.

GO-CART HANDLE.

1,042,193. Specification of Letters Patent. Patented Oct. 22, 1912.

Application filed March 21, 1912. Serial No. 685,143.

*To all whom it may concern:*

Be it known that I, LILIAN BOWLING, a citizen of the United States, residing at Fairview, in the county of Major, State of Oklahoma, have invented certain new and useful Improvements in Go-Cart Handles; and I do hereby declare the following to be a full, clear, and exact description of the invention, such as will enable others skilled in the art to which it appertains to make and use the same.

This invention relates to improvements in handles adapted for connection with children's carriages, such as for instance, go-carts of the collapsible type.

The principal object of the invention is to provide a handle and support therefor which may be readily attached to or detached from any collapsible go-cart whereby said cart and handle may be readily collapsed into a compact relation.

Another object of the invention is to provide a support of such construction as to yield under pressure exerted upon the handle when the front end of the cart is being elevated.

A further object of the invention is to provide an extensible handle for the purpose described, whereby the handle may be readily accommodated to persons of different heights.

A still further object of the invention is to provide a handle and support therefor, which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

In the drawing: Figure 1 is a side elevation of a collapsible go-cart showing the application of a handle and support constructed in accordance with my invention, Fig. 2 is a top plan view thereof, Fig. 3 is a longitudinal sectional view through the handle, a portion thereof being shown in elevation, Fig. 4 is a detail sectional view taken on the line 4—4 of Fig. 3, and Fig. 5 is a detail cross sectional view taken on the line 5—5 of Fig. 1.

Like reference numerals designate corresponding parts in all the figures of the drawing.

Referring to the drawing, 5 designates a frame of a commercial collapsible go-cart which is suitably supported upon ground wheels 6. This frame includes the usual arms 7—7 and back 8. Centrally mounted upon each side arm 7 is a handle supporting element, which is designated as a whole by the reference numeral 9. This element is formed from a single length of strap metal, and is centrally bent to form an upwardly extending loop 10 which is disposed above and in spaced relation to the respective side arm 7. The ends of this element thence extend upwardly to form inclined supporting arms 11—11, and these arms are then bent downwardly to form supporting legs 12—12, the legs being secured to a respective side arm 7 by screws or any other suitable fastening means. It is to be observed in connection with this element that the bight of the loop 10 is disposed in a plane considerably below the upper ends of the arms 11.

Secured upon the upper face of each side arm 7 and directly below the loop 10 is a bearing 13 having a transverse pin 14 loosely journaled therein. A handle which is designated as a whole by the reference numeral 15 consists of a pair of tubular arms 16—16 and a U-shaped arm 17 having its ends telescopically mounted within the outer ends of the arms 16, and retained in any adjusted position by means of a set screw 18. The inner end of each arm 16 is bifurcated to form consequent ears, and these ears are disposed on opposite sides of the respective supporting element 9 and are fulcrumed upon the pivot pin 14. Formed in the lower end of each arm 16 and at right angles to the slot formed by said ears are diametrically opposed longitudinal grooves 19—19 which are adapted to alternately engage the upwardly inclined supporting arms 11 of the element 9 when the handle is swung to either its extreme forward or rearward position.

In practice, when it is desired to collapse the frame 5, the handle 15 will readily swing upon its pivot pin 14 and thereby permit of said cart to be arranged in a very compact relation, and as a result, occupy but very little room. When the handle 15 is disposed in either of its extreme positions, and it is desired to elevate that end of the cart opposite the extension arm 17, pressure may be exerted upon said extension arm 17 and this pressure will be cushioned by means of the loop 10, as will be readily understood.

What is claimed is:

1. In a go-cart, the combination with a collapsible frame including side arms, of a handle supporting element including opposed upwardly inclined arms secured upon each side arm, and a U-shaped handle pivoted at its ends to the side arms of the frame intermediate the arms of the element for alternate engagement with said inclined arms.

2. In a go-cart, the combination with a frame including side arms, of a handle supporting element including opposed upwardly inclined arms secured upon each side arm, a bearing secured upon each side arm centrally below the inclined arms of the element, and a U-shaped handle pivoted at its ends to the bearings for alternate engagement with said inclined arms, the ends of the handle being bifurcated to receive the elements.

3. In a go-cart, the combination with a frame including side arms, of a handle supporting element secured upon each side arm, each element being formed from a single length of strap metal and centrally bent to form an upwardly extending loop which is disposed above and in spaced relation to the respective side arm, the ends of the element thence extending upwardly to form inclined supporting arms, the outer ends of said arms being bent downwardly to form supporting legs, the bearing secured to each side arm below the loop of the element, and a U-shaped handle pivoted at its ends to the bearings for alternate engagement with the inclined supporting arms of the elements.

4. In a go-cart, the combination with a frame including side arms, of a handle supporting element including opposed upwardly inclined arms secured upon each side arm, a bearing secured upon each side arm centrally below the inclined arms of the element, and a U-shaped handle pivoted at its ends to the bearings for alternate engagement with said inclined arms, the ends of the handle being bifurcated to receive the elements, the ends of the handle being respectively formed with opposed longitudinal grooves for alternately receiving the inclined arms of the element.

In testimony whereof, I affix my signature, in presence of two witnesses.

LILIAN BOWLING.

Witnesses:
W. D. BOWLING,
F. A. PERKINS.